United States Patent [19]
Spencer

[11] Patent Number: 5,931,087
[45] Date of Patent: Aug. 3, 1999

[54] SPENCCRACKER, AN APPARATUS FOR SHUCKING PECANS

[76] Inventor: Karl L. Spencer, 1763 S. Green River Rd., Cowpens, S.C. 29330-8807

[21] Appl. No.: 09/012,437

[22] Filed: Jan. 23, 1998

[51] Int. Cl.[6] .................................................... A23N 5/00
[52] U.S. Cl. ............................... 99/575; 99/574; 99/581; 99/617
[58] Field of Search ............................. 99/580, 581–583, 99/568–571, 572–579, 567, 600–602, 609, 610, 617–622; 130/120.1, 120.2; 426/481–483

[56] References Cited

U.S. PATENT DOCUMENTS

| | | | |
|---|---|---|---|
| 1,178,075 | 4/1916 | Huston | 99/575 |
| 1,342,692 | 6/1920 | Pape | 99/575 |
| 1,591,251 | 7/1926 | Vaughan | 99/575 X |
| 2,663,340 | 12/1953 | Goodwin | 99/575 |
| 3,662,799 | 5/1972 | Shaw | 99/574 |
| 3,965,810 | 6/1976 | Miller | 99/581 |
| 4,073,032 | 2/1978 | Packwood | 99/574 |
| 4,196,224 | 4/1980 | Falk | 426/483 |
| 4,201,126 | 5/1980 | Evans | 99/579 X |
| 4,218,968 | 8/1980 | Livingston | 99/572 |
| 4,819,331 | 4/1989 | Joyama | 30/120.2 |
| 5,115,733 | 5/1992 | Frederiksen et al. | 99/581 X |
| 5,544,574 | 8/1996 | Daugherty | 99/572 |

*Primary Examiner*—Timothy F. Simone
*Attorney, Agent, or Firm*—F. Rhett Brockington

[57] ABSTRACT

An apparatus for shucking pecans having a stator, which is a trapezoidal front plate with a pair of adjoining tapered side-walls with longitudinal edges, a mounting bracket for immobilizing the stator, and a chute which is a reservoir for the pecans, where said stator is axially connected to a rotor, which is a circular back plate that pivots at the centroid of the front plate; the combination of the back plate and the front plate forming a chamber that is narrow at the bottom, wherein the pecans are cracked as the rotor is rocked back and forth through an arc, where the rocking action forces the pecans into compression and then in the reverse rock into relief, where the shell separates from the kernel.

7 Claims, 4 Drawing Sheets

SPENCCRACKER, AN APPARATUS FOR SHUCKING PECANS

BACKGROUND

The invention is an apparatus for cracking nuts, and more particularly an apparatus for shucking pecans that produces whole halves at a very high percentage.

The prior art of shucking nuts, and in particular shucking pecans using automated or partially automated cracking devices, reads on basically two types of nut crackers, wherein a type is distinguished in terms of how compressive forces are created and applied to the shell of the nut. In the first type, compressive forces are applied simultaneously to substantially the entire surface of the shell, and in the second type the compressive forces are applied progressively, and principally perpendicularly to the longitudinal walls of the shell. The first type of nut cracker usually creates the compressive forces through an collection of rods which in-cage the nut and crush the shell. The second type, which is better suited for automation in that this type usually requires fewer active elements, conveys the nut into a progressively narrower nip which therein causes the longitudinal walls of the shell to be crushed. Illustrative of the first type of nut cracker is Miller' U.S. Pat No. 3,965,810 patent. Miller's nut cracker is comprised of a plurality of rods mounted distally in a pair of handled circular plates having a center aperture. When the handles are twisted, the rods constrict radially, and therein apply leveraged compressive force to the shell of a nut positioned within the rods. An illustration of the second type of nut cracker is Joyama' U.S. Pat No. 4,819,331 invention. Joyama's automated nut cracker looks similar to a centrifugal pump, wherein the gears act to crush a pair of opposing longitudinal walls of the shell, while pumping the nut through the progressively narrower constriction.

Some of the prior art has elements of both types of nut crackers. Daugherty's pecan shucker' U.S. Pat No. 5,544,574, forces the nut through a multitude of rollers using an axial longitudinal rod, wherein the rollers apply circumferential compressive forces to the entering end portion of the shell of the nut. The forces are similar to the first type of cracker, in that they are circumferential, however, similar to the second type in that the compressive forces are acting on only a portion of the nut. In Packwood's nut cracking machine' U.S. Pat No. 4,073,032, the rollers are driven, and there is no need for a rod, however the nut will assume the same orientation, such that an end portion of the nut will be compressed circumverentially. Unanimous to all the prior art is that the nut is always under compression while in the nut cracker, therein not enabling a time for the nut to reorientate. These two factors, constant compression and no reorientation limit the mechanisms by which the shell can separate from the kernel.

The success of the shucking process is generally gauged on the efficiency with which the shell is relieved from the nut without damaging the kernel, and in the case with pecans, the percentage of whole halves has traditionally been the benchmark.

It has been observed that while the first type of nut cracker produces a relatively good percentage of whole halves, the yield is not as high as anticipated. A possible explanation for the lowered efficiency is that while the compressive forces are uniform, their combined effect produces a more rigid shell, because the elongated round shell is under tension inward, and the higher rigidity results in a more explosive type cracking action.

The second type of nut cracker applies force principally to just the sides of the shell, consequently the kernel frequently breaks apart leaving portions of the kernel in the parabolic ends of the pecan, as the nut is never reorientated in the nip, and compression is therefore never applied to the ends of the nut. This second type of nut cracker can have very high through-puts, but often lower efficiency in terms of percentage of whole pecan halves An improved apparatus for cracking nuts, and particularly pecans, would have a mechanical action that would sequentially apply just enough compressive force to a section of the shell so as to crack the shell without damaging the kernel, and continue to repeat the mechanical action until a sufficient number of sections of the shell had been cracked so as to liberate the kernel from the shell, and in so doing produce a very high percentage of whole halves. It necessarily follows that said mechanical action would require either the reorientation of the nut after cracking a section, or reorientation of the spatial axis of the compressive force, relative to the nut

SUMMARY OF THE INVENTION

The invention is an apparatus for shucking pecans, wherein through relatively uncomplicated mechanical means, the invention, produces a mechanical action that shucks pecans, where the resulting kernels are produced with a very high percentage of whole halves.

It is a first object of the instant invention to produce a mechanical action that allows the nuts to be compressed, and then decompressed and reoriented, in a repeating fashion, until substantially all of the shell has been cracked and the shell is relieved from the kernel. The mechanical action is a series of cyclic repetitive movements, which, depending on the location within a chamber, acts on a portion of the nuts to compress a section of the shell of the nut, while another location of the chamber, simultaneously acts on a different portion of nuts to decompress and reorient the nuts. In the succeeding half cycle the action is reversed. The series of cyclic repetitive movements is complete when the shell is relieved from the kernel and the nut is sufficiently diminutive to exit the nut cracker.

It is a second object of the instant invention that the apparatus be relatively inexpensive to manufacture, and that the materials of construction be readily available. Components were selected with consideration being given to not only their functional utility, but also with an eye for the ultimate cost of manufacture, as the instant invention is intended to be sold to the consuming public, as well as professional food processors. A somewhat serendipitous balance was achieved in the inventive process through the selection of existing rugged hardware already in wide distribution, and the functional adeptness of the components which has resulted in a new type of nut cracker that is not only extremely efficient (in the context of whole halves), but also relatively uncomplicated to manufacture.

The invention has a stator, a rotor, and a connecting bearing element that fixes the relative position of the stator and the rotor and enables the rotor to rotate. The stator is mounted to an immobilizing structure, and the rotor pivots through an arc substantially axial to the stator. The stator has a front plate, and the rotor has a back plate. The front plate is a substantially vertically orientated trapezoidal shaped stiff plate with a pair of adjoining tapered side-walls, wherein the upper edge of the top of the plate there is cut out a sectional arc. Attached, near a center loci of the front plate, or a centroid, there is a fastening means for a connecting bearing element which attaches the back plate to the front plate. The fastening means at the centroid is usually just an aperture, however, there can also be other devices, such as a bearing. The connecting bearing element enables the back plate to rotate relatively freely, and provides axial rigidity that keeps the rotation substantially free of wobble, even when perturbed by uneven distortional forces as a consequence of applying compression to a pecan. A trapezoidal face on the front plate is tilted slightly away from the back plate such that the front plate and the back plate are angularly offset from each other, when viewed from the side. The space separating the front plate from the back plate is wider at the top than at the bottom, so that a chamber, formed by the attached front and back plate, is wider at an entrance than at an exit at the bottom of the chamber. The adjoining side-walls are appropriately tapered along their longitudinal edges to allow for the angular offset of the two plates, such that cracked nuts are retained by the sidewalls, and yet the back plate can rotate in either direction with minimal resistance while the front plate is held stationary. The space separating the front plate from the back plate can be fine tuned by adjusting the connecting bearing element, which generally consists of a threaded fastening component (s). The front plate is fitted with a mounting bracket for securing the apparatus to a table or other suitable immobilizing structure. Both the front plate and the back plate have a textured surface. A preferred material is a heavy gauge Checker Plate. The back plate is fitted with a driving element, such that when powered, the entire back plate is rotated back and forth through an arc in a reciprocating manner. For manual operation a pipe can serve as a driving element. Mechanized versions would employ some type of cam arrangement. The entrance of the chamber is suitably wide enough to accommodate the feeding of pecans and other nuts. The entrance is fitted with a chute, which extends outward from the sectional arc of the upper edge, wherein the chute serves as a reservoir for feeding the nuts into the apparatus. The exit of the chamber is sufficiently narrow as to prevent uncracked nuts from escaping.

To better understand the mechanism of the invention, imagine a perpendicular plane vertically bisecting the chamber created by the front and back plates. The invention works as follows. The chute is loaded with nuts, and then the apparatus is activated. Activation causes the driving element to rock the back plate to-and-fro through a 30 to 120 degree arc. A preferred degree arc is 40–90, and the more preferred degree arc is 45–60. The rocking action, incidentally, jostles the nuts, therein imparting vibrational energy to the nuts so that they slide down the chute into the entrance of the chamber. In the chamber, the nuts have a brief period in which they orient based on their shape in relation to the progressively narrower dimensions within the chamber. The angular motion of the back plate creates vectoral forces on the nut that, depending on the location of the nut within the chamber, tend to move the nut deeper into the chamber or to an position having reduced compressive action. Arbitrarily picking a starting point for the first half cycle, assume that the back plate moves from the left to the right. Nuts in the chamber located at the right outer-most side of the chamber will be conveyed the furthest distance downward through the chamber as the back plate rotates right, because the nuts are furthest from the axis, and the motion tends to convey them downward deeper into the chamber. Since the chamber gets progressively narrower from top to bottom then the compressive cracking forces are highest on a nut near a periphery of the back plate. Nuts located further to the left, closer to the perpendicular plane, will tend to be conveyed laterally, as the angular movement of the back plate to the right will tend to move the nuts longitudinally to the right. Also, nuts already under compression can shift toward the axis to relieve some of the compressive forces during the rotation. In contrast, nuts in the left most portion of the chamber, will be conveyed the furthest distance upward through the chamber, and to a region of minimal compression. Under relief of compression, there is then ample room for the kernel to separate from the shell. The nuts just above or below the axis of rotation are conveyed longitudinally either to the right or left, depending on their relative orientation. This movement can enable the nut to reorient if further cracking is required. In the second half of the cycle the back plate is moved left, back through the center position and then all the way left. The reciprocal action reverses which nuts are under compression and which are in relief Below the axis, the trapezoidal shape of the tapered front plate keeps the nuts closer to the perpendicular plane of the apparatus, therefore most of the movement in the narrower regions of the chamber, is longitudinal, and the resulting compressive forces are more subtle and less likely to damage the kernel. The combination of compression and relief results in a nut cracker that produces whole halves at a very high percentage. In summary the shucking steps are iterative, and consists of the following:

1. Moving a whole pecan(s) or a partially shucked pecan (s) to a location in the apparatus wherein compression is high, therein applying sufficient compression to a partial shell wall to affect cracking;

2. Removing said whole pecan(s) or said partially shucked pecan(s) to another location in the apparatus wherein compression is low, therein creating sufficient space for the partial shell wall to separate from the kernel, and wherein the step of said removing incidentally generates sufficient vibrational energy to enable the pecan to reorient in the apparatus;

3. Repeating the first two steps until the shucking process has reduced the pecan to a size sufficiently diminutive to exit the apparatus.

It is anticipated that the instant invention can readily be mechanized and further automated. The modifications would not materially benefit nor change the underlying art of the invention.

DESCRIPTION OF THE DRAWINGS

FIG. 3-1 is a partial frontal view of the apparatus showing the relative position of a nut just entering the nut cracker. The front plate 12 is shown in phantom. One of the checkers on the back plate is cross-hatched to augment for the viewer the angular movement of the back plate.

FIG. 3-2 is the apparatus shown in FIG. 3-1, wherein the back plate has been rotated clockwise approximately 30 degrees.

FIG. 3—3 is the apparatus shown in FIG. 3-1, wherein the back plate has been rotated clockwise approximately 60 degrees.

DETAILED DESCRIPTION OF THE PREFERRED EMBODIMENT

Figure 1:
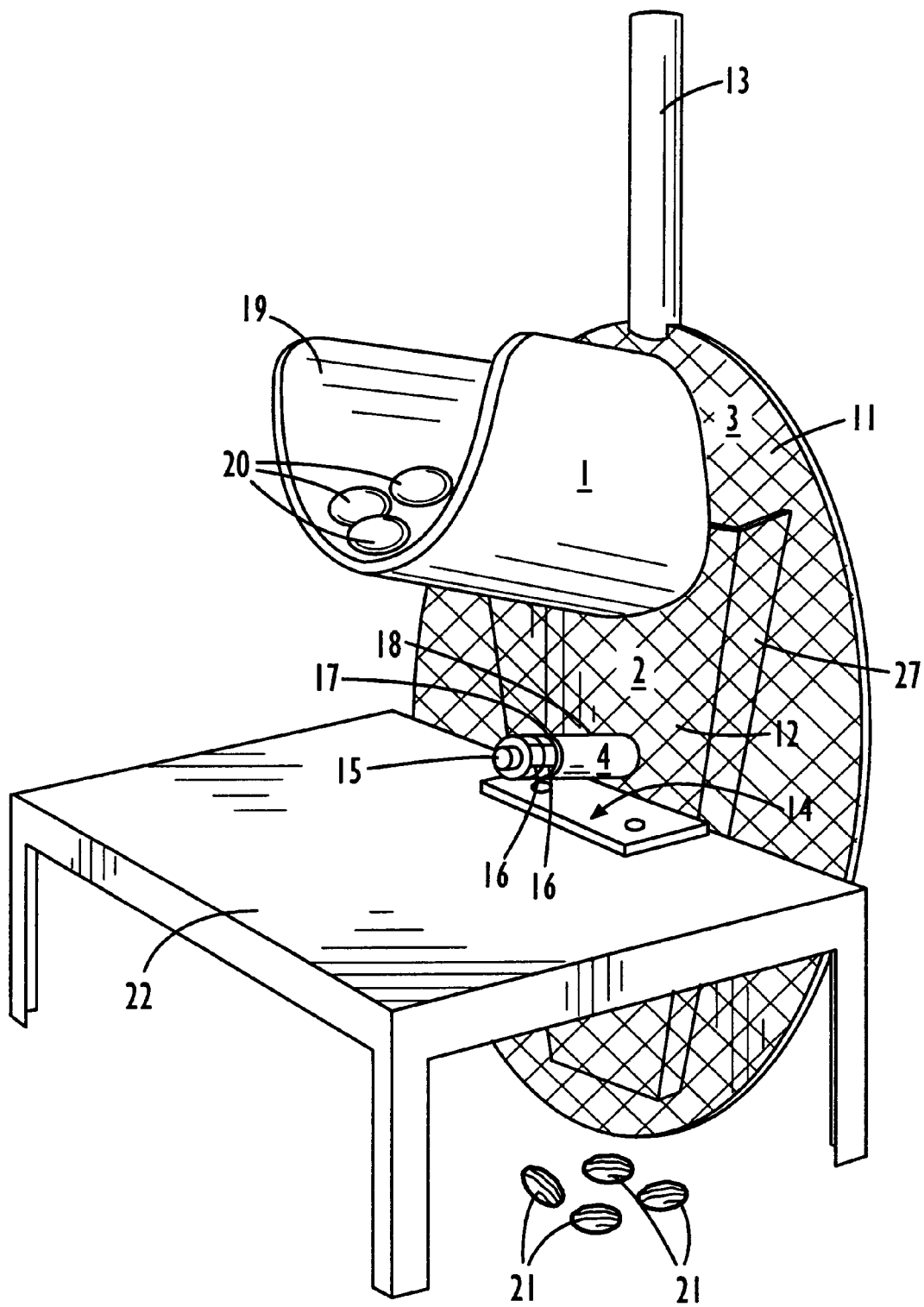
FIG. 1 is a perspective view of the apparatus mounted on a table.
Figure 4:
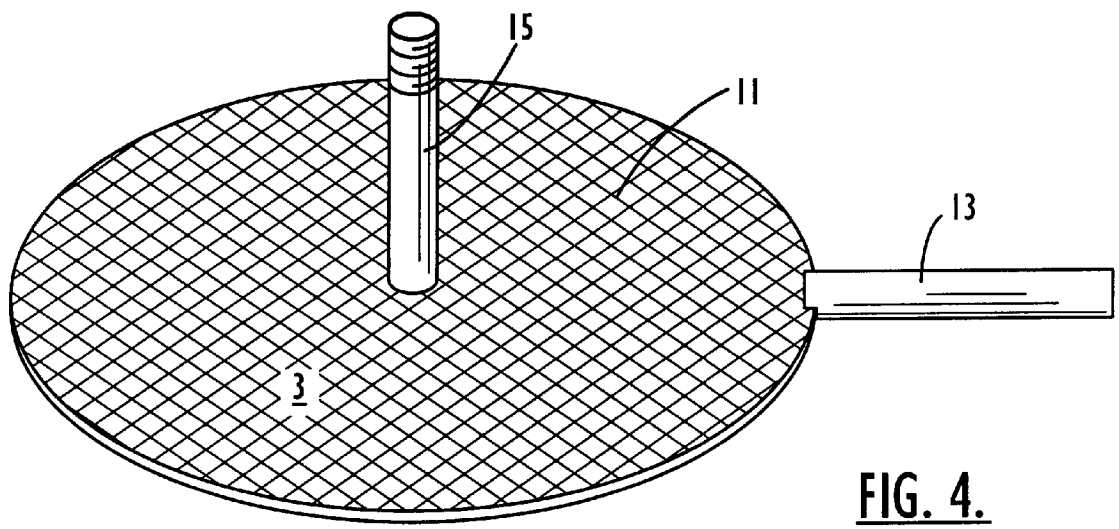
FIG. 4 is a perspective view of the checkered side of the back plate showing the projecting bolt that is tap welded to the back plate.
Figure 5:
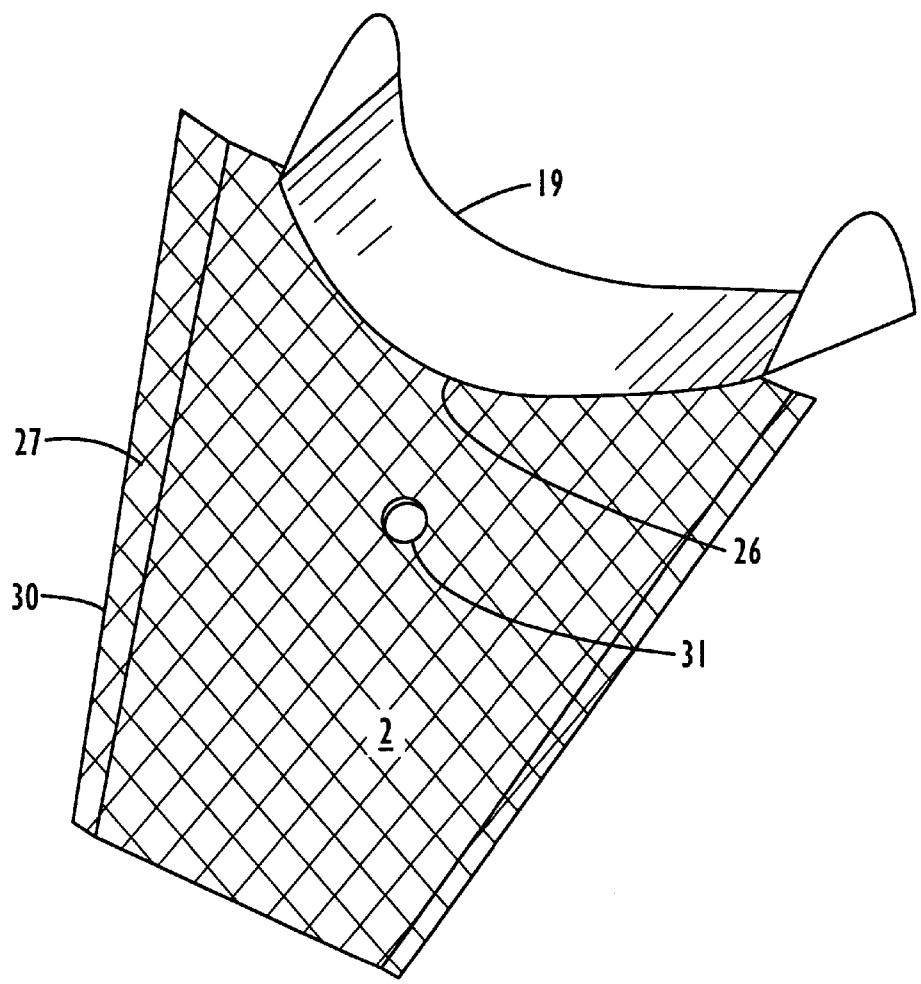
FIG. 5 is a perspective view of the checkered side of the front plate showing the aperture through which the bolt is inserted, and the connecting arc cut in the front plate to which is welded the chute.

FIG. 1 is a perspective drawing of the invention 1. The invention is hand operated and is called the SpencCracker. There are three major components, the stator 2, the rotor 3, and the connecting bearing element 4. The stator 2 has a front plate 12, and the rotor 3 has a back plate 11. The back plate 11 is fitted with a handle 13 for rocking the back plate 11 through an arc. The arc is typically around plus or minus 30 degrees off the vertical, for a total of 60 degrees from left to right, and then 60 degrees from right to left, and so on. In operation the handle 13 would be rocked until all the pecans are shucked. The back plate 11 and the front plate 12 are fabricated with heavy gauge Checker Plate, which is a steel sheet typically utilized in the construction of catwalks, and other industrial applications. The steel sheet has a cross-hatched or checkered pattern stamped into it to impart a roughened texture to the steel sheet. The checkered pattern reduces slippage. The back plate 11 and the front plate 12 are positioned such that the checkered pattern of the front plate 12 faces the checkered pattern of the back plate 11 to maximize the gripping characteristics of the two plates. The back plate 11 is connected to the front plate 12 with the connecting bearing element 4, which consists of a bolt 15, which is welded to the back plate 11, a sleeve 18, a washer 17, and a pair of suitable nuts 16. FIG. 4 and FIG. 5 show the bolt 15, of a disassembled connecting bearing element. The bolt 15 projects perpendicularly from the back plate. The bolt 15 is tap welded to the side of the back plate 11 which is out of view. The bolt 15 projects through an aperture 31 in the front plate 12. The aperture 31 is shown in FIG. 5. Note the taper in the side-wall 30 from the top of the plate to the bottom substantially determines the depth of the chamber. The connecting bearing element 4 enables the back plate to rotate relatively freely, and provides axial rigidity that keeps the rotation substantially free of wobble or flex, even when perturbed by uneven distortional forces as a consequence of applying compression to a pecan. Pecans 20 are loaded into the chute 19 prior and during shucking. The chute 19 serves as a reservoir for the pecans 20, and also funnels the pecans into the pecan shucker 1. The chute 19 is welded to the sectional arc 26 of the front plate 12. Both of the side-walls 27 on the front plate can also be viewed in FIG. 5. The pecan shucker is mounted on an immobilizing surface when in use. In FIG. 1 a bracket 14 is used to mount the front plate 12 to a table 22. The bracket 14 can be viewed from the side in FIG. 2. Referring again to FIG. 2, note that the side-walls 27 and the trapezoidal face 28 of the front plate, in combination with the back plate 11, form the chamber 23. The entrance 24 to the chamber 23 and the exit 25 are marked accordingly. The chamber 23 is where the pecans are shucked. The space in the chamber 23, as measured from the front plate 12 and the back plate 11, can be adjusted slightly by narrowing the gap 29 between the back plate and the longitudinal edge of a side-wall 30. This adjustment will periodically be required to accommodate pecans having atypical dimensions. The adjustment can facilely be made by appropriately tightening or loosening the nuts 16 on the connecting bearing element 4. The front plate 12 is angled relative to the back plate 11 such that the space in the chamber 23 is much tighter near the exit 25, than at the entrance 24. Dimensions of a prototypical invention are side-walls 1.5 inches wide at the entrance, and tapering to 0.5 inches at the exit. The trapezoidal face is 8.25 inches at the top, and 5 inches at the bottom. The diameter of the back plate is 10 inches, with a 4 inch handle. The bolt of the connecting bearing element is 0.75 inches in diameter and 6 inches long. The Checker Plate is approximately 0.125 inches thick.

Figure 2:
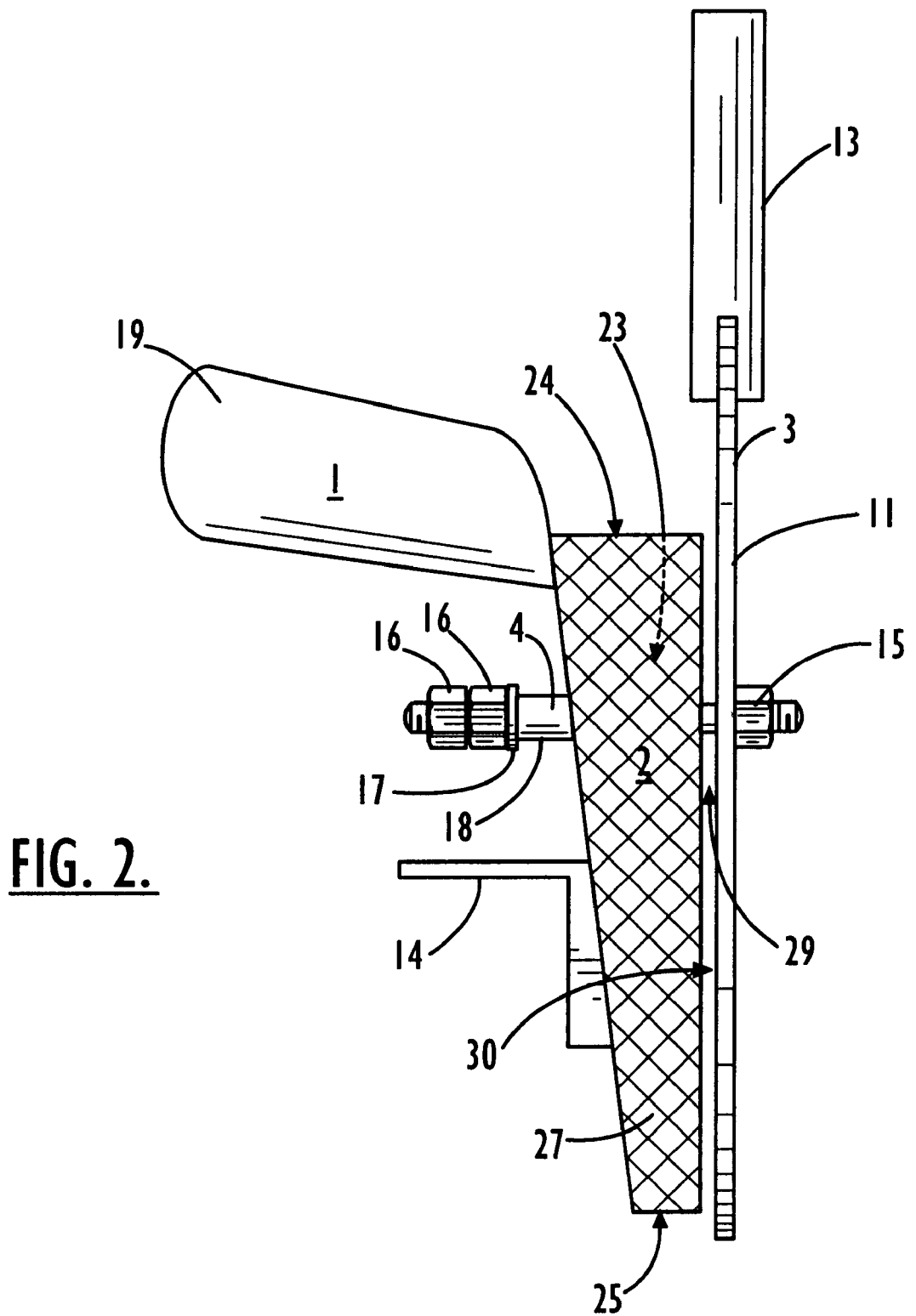
FIG. 2 is a side plan view of the apparatus.
Figure 3:
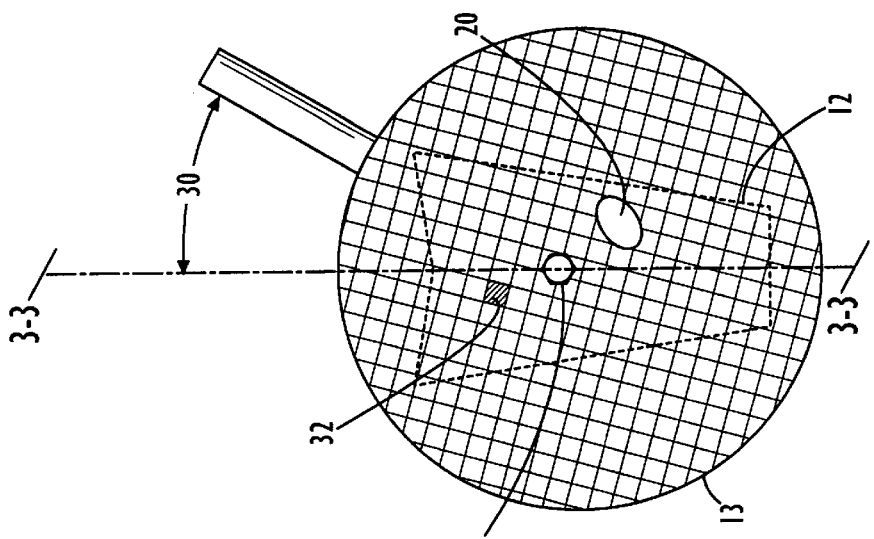
Figures 2, 3:
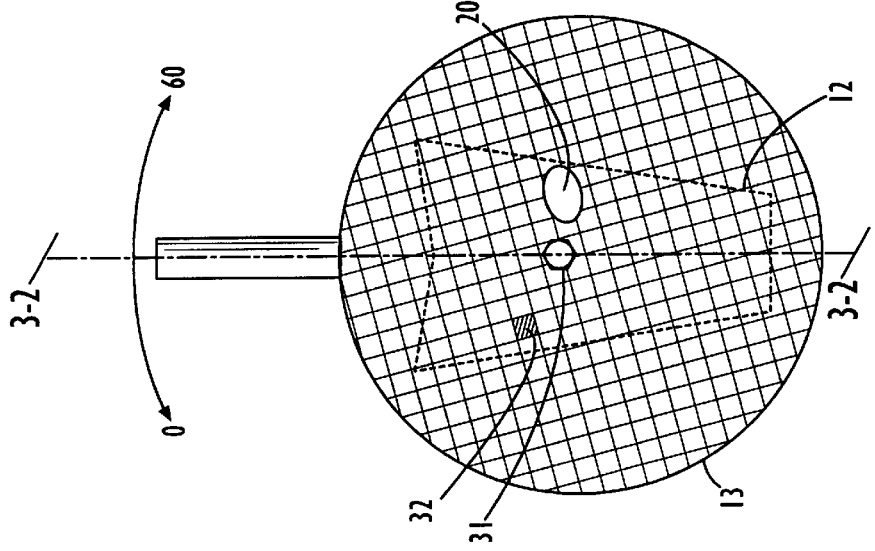
Figures 1, 3:
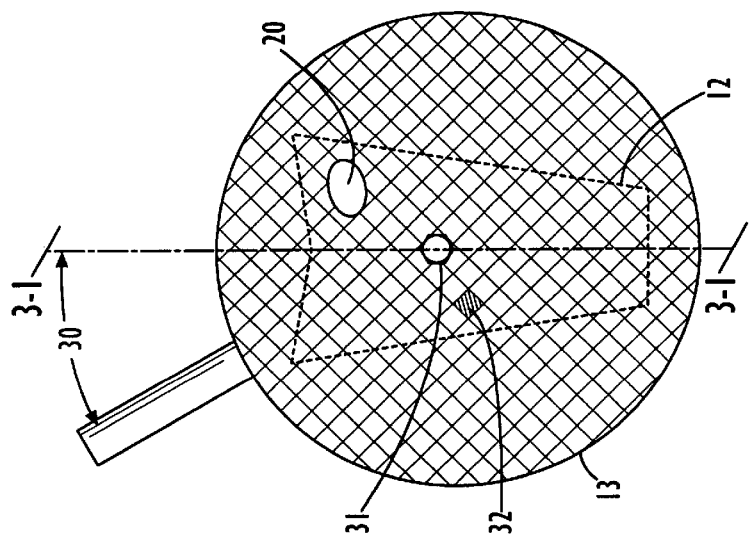

FIG. 3-1, FIG. 3-2, and FIG. 3—3 sequentially take the reader through the action of the instant invention. The action is angular, with the pivot point being the aperture 31 through which the bolt 15 of the connecting bearing element 4 passes. One of the checkers 32 has been marked with cross-hatching to more clearly describe the action on both sides of the perpendicular plane. A perpendicular plane is indicated by sectional lines 3-1, 3-2 and 3—3 respectively. From observing FIG. 1 to FIG. 3, the pecan 20 is forced further down into the chamber as the handle is moved from the left to the right. The pecan 20 would be cracked with action. This movement was described in the first step of the shucking process previously elaborated on. On the opposite side of the perpendicular plane, the cross-hatched checker 32 has shifted upward, removed to a position where there is sufficient room for a portion of the shell wall of the pecan to separate from the kernel. The action of the cross-hatched checker corresponds to the second step in the shucking process. In the succeeding iterative operation the handle would be moved from the right to the left, and the actions of the pecan and the cross-hatched checker would be reversed. Ultimately all of the shell wall is removed, and the size the processed component parts would be sufficiently diminutive to exit the apparatus. This step corresponds to the third step in the shucking process.

I claim:

1. An apparatus for shucking nuts comprised of:

a stator, having an orientation that is slightly offset from vertical, comprising a stiff front plate with a trapezoidal face and having a pair of adjoining tapered side-walls with longitudinal edges, wherein the front plate has a textured surface, and forms a static portion of a chamber, wherein an interior wall surface of the chamber is textured to reduce slippage, wherein the front plate has an immobilizing mounting bracket, a fastening means for a connecting bearing element near a centroid of the front plate, and a chute for supplying nuts to the chamber;

a rotor, having a substantially a vertically orientation, which has a reciprocal and angular rocking rotation, substantially axially aligned to the centroid of the stator, wherein the rotor is a stiff back plate that is substantially circular, wherein the back plate can be rotated in a plane offset from a plane defined by the trapezoidal face of the front plate, wherein said rotation is substantially parallel to the longitudinal edges of the side-walls, wherein the offset between the front plate and the back plate creates a gradual narrowing in the chamber from an entrance in the chamber to an exit, wherein the back plate has a textured surface resulting an interior posterior wall surface of the chamber that is textured to reduce slippage, wherein the back plate has an opposing fastening means for a connecting bearing element joining the stator and the rotor, and a driving element that can cause the back plate to rock back and forth through a 30–120 degree arc;

said connecting bearing element that joins the stator to the rotor has an axial element that enables the rotor to move, substantially free of wobble or flex, angularly, and a spacing element to fine tune a size of the chamber by adjusting a component which sets a distance between the longitudinal edges of the front plate and the back plate.

2. An apparatus for shucking nuts claimed in claim 1 wherein the back plate is constructed using checker plate.

3. An apparatus for shucking nuts claimed in claim 1 wherein the front plate is constructed using checker plate.

4. An apparatus for shucking nuts claimed in claim 1 wherein the invention is manually powered, and said driving element is a section of metal tubing tap welded to the back plate.

5. An apparatus for shucking g nuts claimed in claim 4 wherein the preferred degree arc is 40–90, and the more preferred degree arc is 45–60.

6. An apparatus for shucking nuts claimed in claim 1 wherein the invention is machine powered, and said driving element is a cam.

7. An apparatus for shucking nuts claimed in claim 1 wherein the connecting bearing element consists of a bolt which is tap welded to the back plate, a spacer sleeve, washers, and fastening nuts.

* * * * *